(No Model.)

C. D. McCORMACK.
CAR COUPLING.

No. 256,152. Patented Apr. 11, 1882.

WITNESSES
Fred. G. Dieterich.
P. T. Dieterich.

INVENTOR
C. D. McCormack.
Wm. J. Johnston
J. H. McDonald
Attorneys

UNITED STATES PATENT OFFICE.

CHARLES D. McCORMACK, OF BATESVILLE, ARKANSAS.

CAR-COUPLING.

SPECIFICATION forming part of Letters Patent No. 256,152, dated April 11, 1882.

Application filed February 3, 1882. (No model.)

*To all whom it may concern:*

Be it known that I, CHARLES D. McCORMACK, a citizen of the United States, residing at Batesville, in the county of Independence and State of Arkansas, have invented certain new and useful Improvements in Car-Couplers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to car-couplers; and it consists in details of construction and arrangement of the several parts, that will be hereinafter more fully set forth in the specification and claims, and pointed out in the accompanying drawings, in which—

Figure 1:
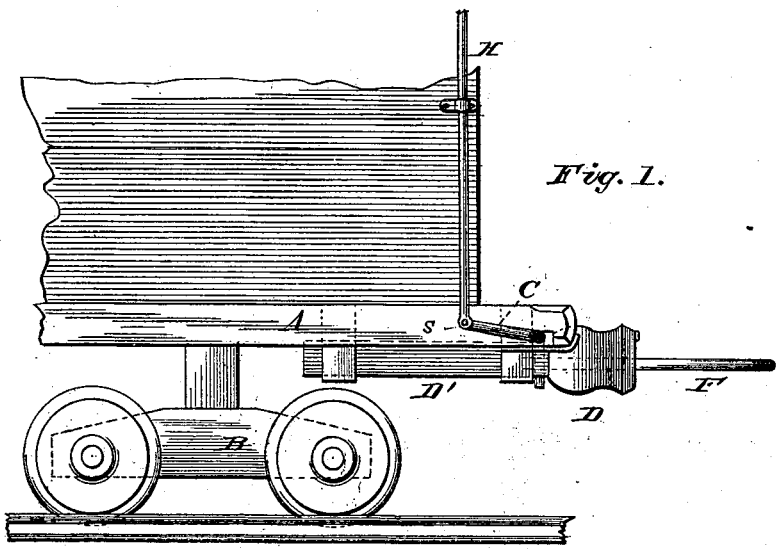
Figure 2:
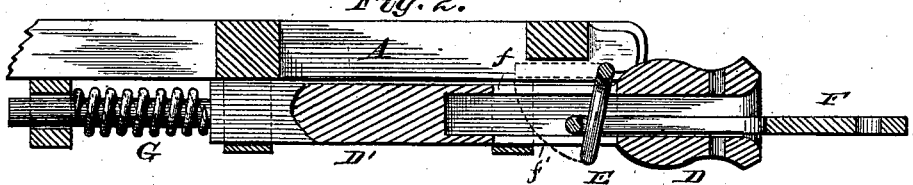
Figure 3:
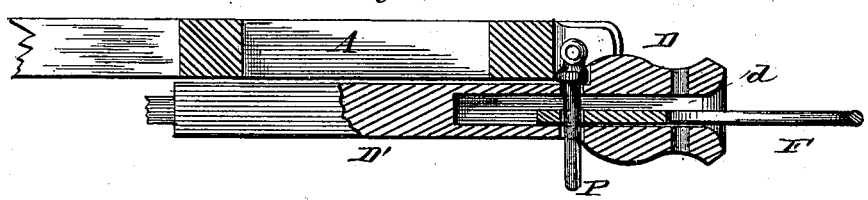
Figure 4:
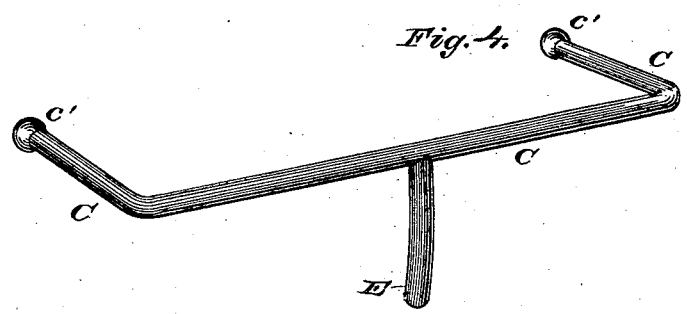

Figure 1 is a side elevation of a car embodying my device; Fig. 2, a sectional view of the coupler; Fig. 3, a modification of same, and Fig. 4 a perspective view of the coupling-lever.

Referring more particularly to the drawings, A represents the frame of the car, to the under side of which is secured a coupling-lever, C. This lever is placed above the draw-bar D' and in rear of the draw-head D, the draw-bar having an upper and lower slot, $ff'$, for the admission and play of a coupling-pin, E, made integral with the lever C. This pin is slightly curved on the inner side, so as to draw the link back when the lever is raised for uncoupling. The lever being placed back of the draw-head compels the draft to be directly and squarely against the back of the draw-head. When a car is to be coupled the link F enters the drawhead, and when it gets to the pin E it pushes it upward and backward, as indicated in dotted lines, Fig. 2, and at same time raises the lever C. As soon as the end of the link has passed beyond the pin the lever acts to return the pin to its normal position, and the pin then holds the link by its inner curved face, and the "pull" is directly against the draw-head. When it is desired to uncouple a car the outer end, $c'$, of the lever is raised, which of course turns pin E backward and upward, and the link is disengaged therefrom. The ends $c'$ of the lever are extended at right angles to the main part C and at each side of the car, so that the person coupling and uncoupling can move the lever from each side and without stepping or reaching in between the cars.

Attached to either one of the extensions $c'$ is a rod, H, secured to the extension by a stirrup or link, $s$, and extending to the top of the car, so that a car may be uncoupled by the brakeman from the top of the car.

It will be noted that the coupling up is automatic; and it is only when a car is to be uncoupled that the lever is to be raised. In its normal position the ends $c'$ of the lever are horizontal, so there is no danger of the pin becoming disengaged from the link by the jar of the car.

The lever C and its pin E can be easily replaced when necessary, and need be of no greater size than the ordinary coupling-pin. In fact, the lever may be of smaller size round iron than the pin E.

It will thus be seen that the device can be easily and cheaply made and can be attached to the ordinary freight and passenger cars. When attached to a passenger-car the ends or extensions $c'$ will be placed underneath the steps, so as to be out of the way, and will be of sufficient length to clear the side of the steps next to the body of the car.

This form of construction obviates the necessity of slotting or perforating the draw-head for the insertion of a lever and pin, for it is well known that such construction is an element of weakness in the head, and when the pin becomes bent or broken in the head it is difficult to remove, and in such cases generally requires the destruction of the draw-bar.

Having thus described my invention, what I claim as new, and desire to secure by Letters Patent, is—

1. In a car-coupler, the lever C, journaled in the under side of the car-frame, and passing above the draw-bar and provided with a central pin, E, adapted to enter and move in slots in the draw-bar, said lever extending from side to side of the car, substantially as shown, and for the purpose set forth.

2. In a car-coupler, the combination, with a hollow draw-bar having the slots $f\,f'$ in rear of the draw-head, of a lever, C, extending from side to side of the car above the draw-bar, in rear of the draw-head, and journaled in the car-frame and provided with a central holding-pin, E, and pivoted rod H, substantially as shown, and for the purpose set forth.

In testimony whereof I affix my signature in presence of two witnesses.

CHARLES D. McCORMACK.

Witnesses:
  WM. C. McGILL, Jr.,
  W. C. DUVALL.